UNITED STATES PATENT OFFICE.

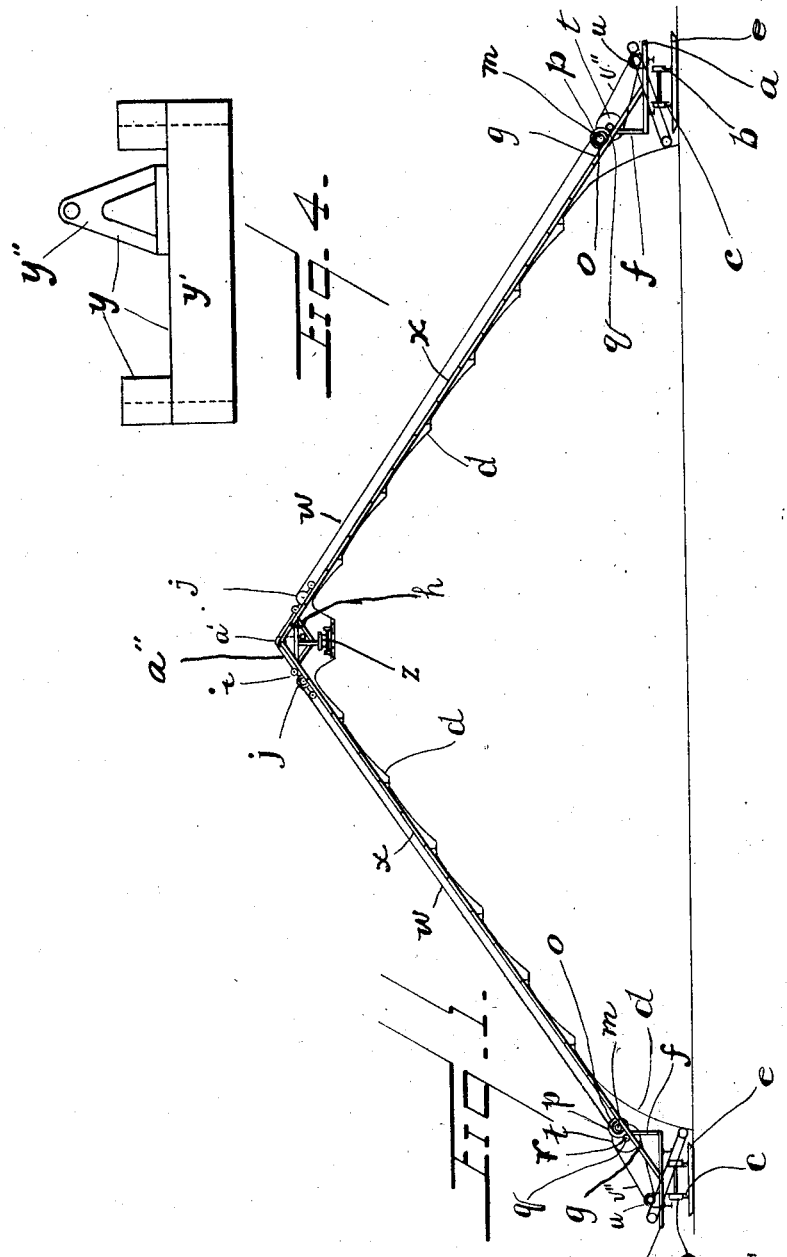

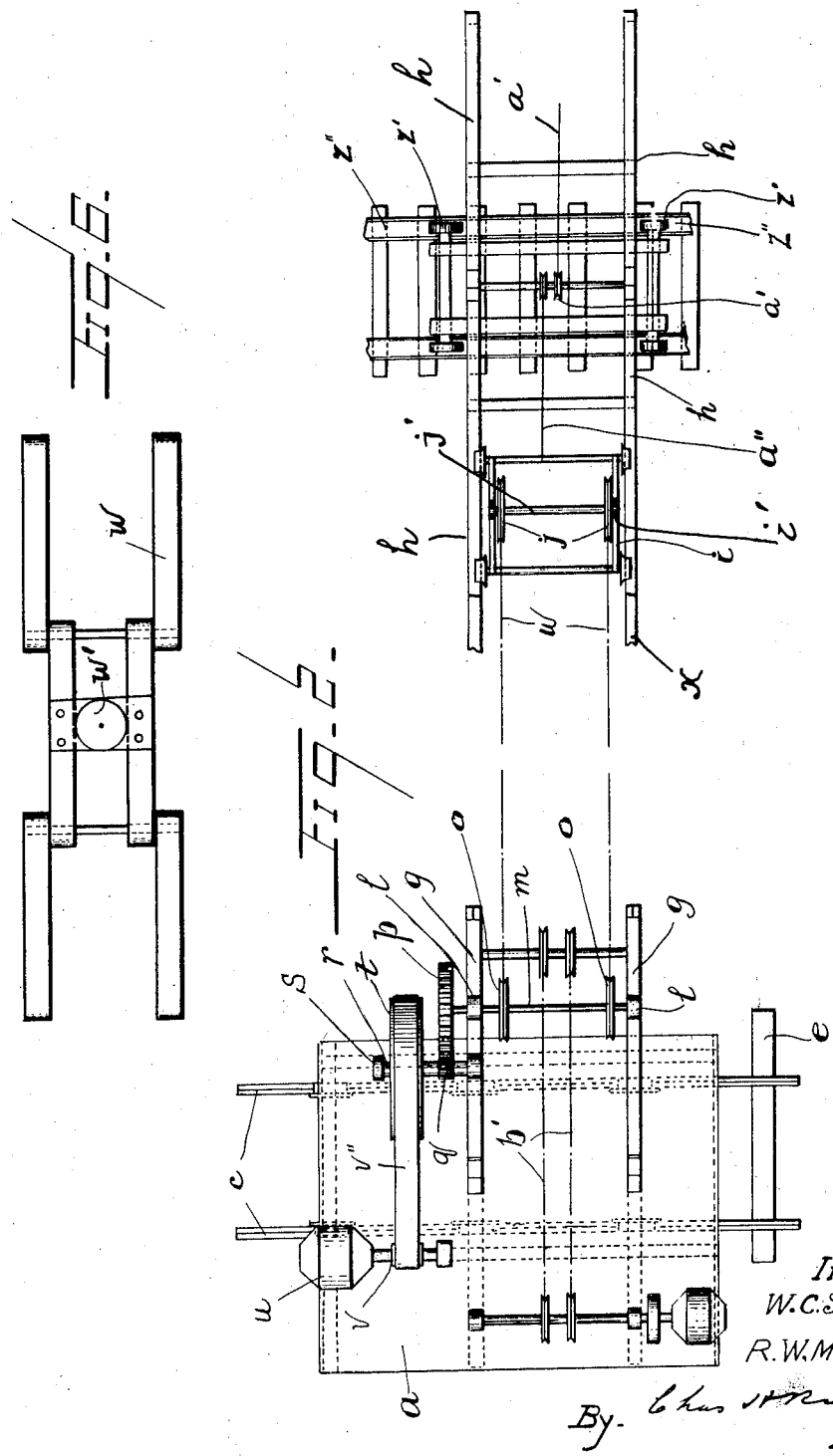

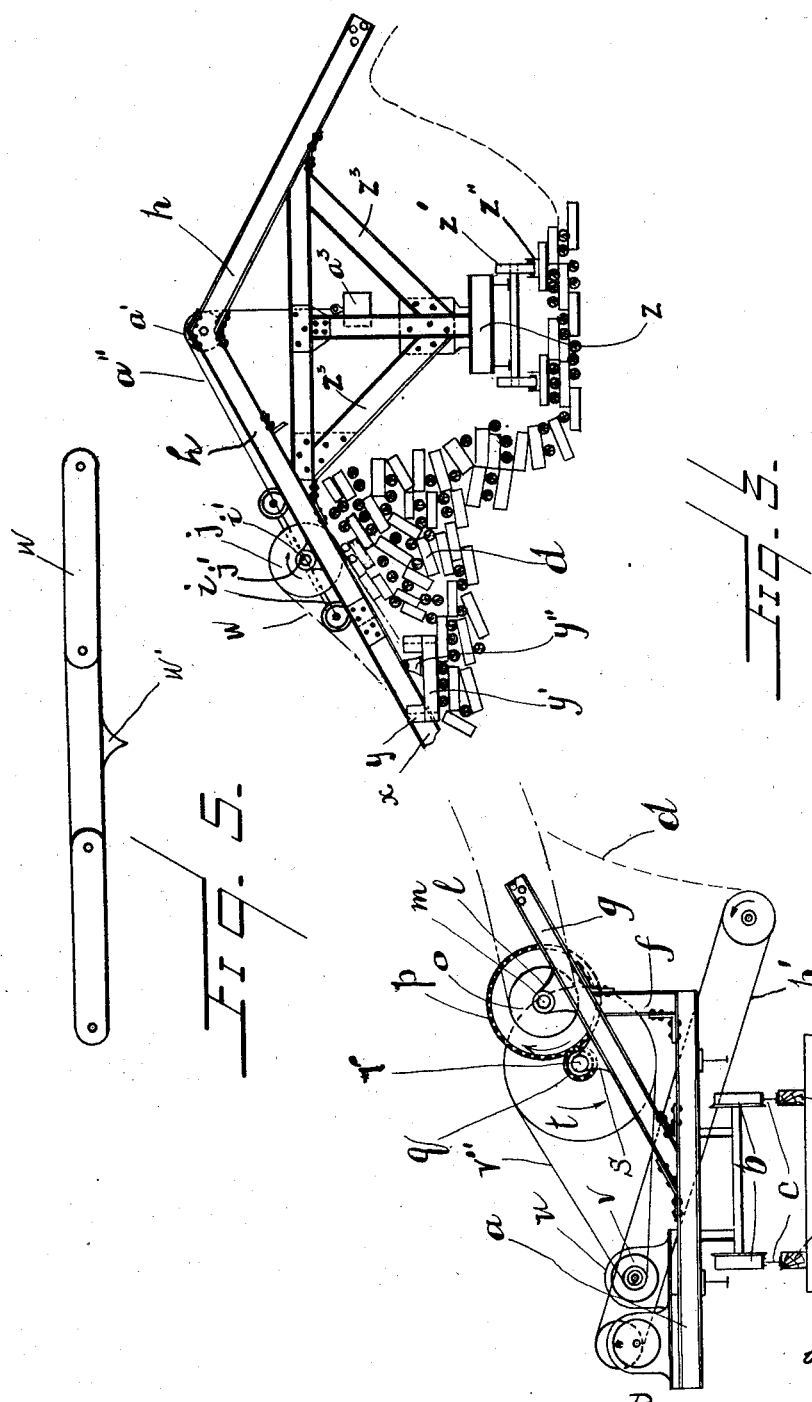

WILBERT CARRON SOUBLIERE AND ROBERT WILLIAM McKENZIE, OF IROQUOIS FALLS, ONTARIO, CANADA.

APPARATUS FOR RECLAIMING OR RECOVERING LOGS OR BLOCKS FROM STORAGE-PILES.

1,335,132.      Specification of Letters Patent.      Patented Mar. 30, 1920.

Application filed July 10, 1919. Serial No. 309,927.

*To all whom it may concern:*

Be it known that we, WILBERT CARRON SOUBLIERE and ROBERT WILLIAM McKENZIE, British subjects, residing at Iroquois Falls, in the district of Temiskaming and Province of Ontario, Dominion of Canada, have invented an Apparatus for Reclaiming or Recovering Logs or Blocks from Storage-Piles; and we declare the following to be a full, clear, and exact description of the same.

For storage purposes, pulpwood logs or blocks are delivered by a stacker into a pile. In the course of time the pile attains cubic dimensions of considerable magnitude and the logs or blocks take an angle of repose which in the interests of safety it is necessary to break gradually during the reclaiming operation.

Our present invention relates to an apparatus particularly designed for reclaiming or recovering the logs or blocks and the object of the invention is to so construct and assemble the parts of the apparatus that it can be readily adjusted to the height and width of the pile and to so operate the reclaiming mechanism that it will successively drag the logs or blocks down the side, starting at the top, without disturbing the angle of repose of those remaining in the pile more than is necessary for the release of the logs or blocks reclaimed, thus reducing, if not entirely eliminating the possibility of a slide and the danger resulting therefrom, this object being attained by the construction hereinafter set forth and particularly pointed out in the claims, reference being had to the accompanying drawings in which:

Figure 1, is an elevational view of an apparatus suitable for simultaneously reclaiming the blocks from both sides of the pile, Fig. 2, is a fragmentary top plan view, and Fig. 3, is a fragmentary elevational view of the same apparatus on a larger scale than Fig. 1, Fig. 4, is a detail view of one of the supports for the sides of the apparatus, Fig. 5, is a detail view of part of the sprocket chain, showing a drag element, and Fig. 6 is a plan view of the part of the sprocket chain shown in Fig. 5.

Like characters of reference refer to like parts throughout the specification and drawings.

The apparatus hereinafter described comprises a main carriage movable lengthwise and laterally of the storage pile, means movable with the carriage for reclaiming the logs or blocks, and other means for transporting them to a place of delivery.

The main carriage includes in its construction a platform $a$ provided with carriage wheels $b$ mounted on suitable tracks $c$ arranged lengthwise of the storage pile, so that it may travel from end to end thereof and enable the reclaiming means to drag the logs down the side of the pile $d$ for its entire length before the apparatus is adjusted laterally thereto. For conveniently adjusting the apparatus laterally with relation to the pile the tracks $c$ may be mounted upon sleepers $e$ arranged as skids. At what may be termed the inner side of the carriage are standards or uprights $f$ and bolted to the standards and to the platform $a$ are parallel channel or I-beams, which form the bottom unit $g$ of the supporting structure for the reclaiming means.

As shown in Figs. 1 and 3, these channel or I-beams take an inclined direction at suitable angles to the carriage platform and standards $f$, an angle of between 30° and 40° with the platform and between 50° and 60° with the standard has been found to be suitable for the purpose.

The bottom unit $g$ is provided with stationary bearings $l$ in which is journaled a shaft $m$. On the shaft $m$ are two sprocket wheels $o$ and a spur wheel $p$. The spur wheel $p$ meshes with a pinion wheel $q$ on a shaft $r$ journaled in bearings $s$ on the bottom unit $g$. On the shaft $r$ is a pulley $t$ and on the carriage platform is a motor $u$ having a pulley $v$ from which the pulley $t$ is driven by means of a belt $v''$.

This arrangement while providing a convenient drive for the sprocket wheels $o$ may be varied, modified or changed, as any other suitable motion transmitting means within the scope of the appended claims may be employed for the purpose of causing the travel of the sprocket chains hereinafter described.

At the top of the supporting structure of the reclaiming means in the top unit $h$ composed of parallel channel or I-beams having the same angle of inclination as those of the bottom unit. The beams of this unit form a trackway for a take-up carriage $i$, and on this carriage are bearings $i'$, in which is journaled a shaft $j'$ on which are two sprocket wheels $j$, alined with the sprocket wheels $o$ when the parts of the supporting structure are assembled.

Passing around the sprocket wheels $j$ and $o$ are sprocket chains $w$ composed of removable and interchangeable links, having at intervals throughout their lengths drag elements $w'$ to engage the logs or blocks and drag them down the side of the pile.

Between the bottom and top units $g$ and $h$ respectively of the supporting structure are the intermediate units, $x$, removably bolted or otherwise secured to each other and to the bottom and top units, the purpose of these intermediate units being to increase or decrease the length of the supporting structure and bring the various parts of the apparatus into correct relation to the top and side of the pile.

The length of the supporting structure varies according to the height of the pile and at the commencement of the reclaiming operation frequently exceeds two hundred and fifty feet. To prevent the sagging of the supporting structure sides, the intermediate units $x$ are provided with supports $y$.

Each of these supports consist of a base $y'$ to rest on the logs in the pile, and a standard $y''$ rigidly secured to the base and pivotally secured to its respective intermediate unit so as to adapt the support to the general contour of the seat formed in the side of the pile to receive it.

The top unit is supported, preferably by a carriage for its lengthwise travel and this carriage consists of a platform $z$, provided with carriage wheels $z'$, mounted on tracks $z''$ arranged lengthwise of the pile for the travel of the top unit, and with suitable braces $z^3$ to rigidly support the upper end of the top unit, the braces being arranged in any suitable truss formation.

Journaled at the top of the top unit is an idler $a'$ and connected to the take-up carriage $i$ is one end of a cable $a''$, the cable passing over the idler and having a weight $a^3$ suspended from its other end to draw the take-up carriage upward on the top unit and take-up the slack in the sprocket chains.

As explanatory of the utility of the invention it might be stated that the pulp wood logs and blocks are stacked in piles often having a length up to 1000 to 1500 feet. Heretofore, it was the practice to start reclaiming the logs from the bottom of the pile. To effect the reclamation in this way it was necessary to blast with dynamite, the blasting always disturbing the mass equilibrium of the pile and frequently causing a slide of the logs or blocks which always endangered the safety of those in the vicinity.

The present apparatus avoids the danger of a slide by systematically reclaiming the logs or blocks individually, commencing at the top and successively dragging the uppermost logs or blocks on the side of the pile to the bottom.

To accomplish this a trackway is excavated lengthwise of the top of the pile and the tracks $z''$ are laid on the trackway for the carriage of the top unit, so that the carriage may move from end to end thereof.

When the tracks $z''$ are laid and the carriage of the top unit is mounted thereon the bottom unit is connected with the top unit, when necessary by the intermediate units, these intermediate units being rigidly bolted to the top and bottom units and to each other.

As the width and the height of the pile is in proportion to its length it necessarily follows that the sides of the supporting structure are usually several hundred feet in length. Owing to this length it is impossible when the intermediate units are bolted to the top and bottom units and to each other to maintain sufficient rigidity to prevent the supporting structure sagging. For that reason the supports $y$ are employed and so pivoted to the intermediate units as to adapt themselves to the seats excavated for them among the blocks or logs.

The apparatus may be either of a single character to operate on one side of the pile or it may be of a duplex character operating simultaneously on both sides. In the latter case the top unit is of a triangular shape as shown in Figs. 1 and 3, and is supported by a single carriage, and two main carriages are employed, one on each side of the pile, the corresponding intermediate units being connected to the top unit and to the two bottom units as previously described.

As the operation of a single or duplex apparatus is the same, one description will answer for both. A trackway is built along the top of the pile and the top unit and its carriage is mounted thereon. The trackways for the main carriages are built along the ground at the sides of the pile and the main carriages are mounted thereon. The bottom units are connected with the apex unit, and the sprocket chains are connected around their respective sprocket wheels.

Motion is transmitted by the sprocket wheels to the sprocket chains, which descend along the under side of the supporting structure, the drag elements $w'$ during the travel engaging in succession the uppermost blocks or logs on the side and dragging them to the bottom of the pile where they are received by conveyers $b'$, which transport them to the place of delivery, the conveyers $b'$ being preferably mounted on the main carriages.

When the drag elements have removed all of the blocks or logs in their path, the main carriages are moved lengthwise on the tracks $c$ and the apex carriage on the tracks $z''$ for the next setting of the apparatus and the same thing is repeated until the apparatus has traveled to the opposite end of the pile. One of the intermediate units is then removed from the side of the supporting structure and the tracks $z''$ for the carriage of the apex unit are then lowered. The tracks for the main carriages are then moved laterally inward toward the reduced width of the pile and the remaining intermediate units of the supporting structure are then coupled to the apex and bottom units and the reclaiming operation is again repeated, the removal of the intermediate units and the lowering of the apex unit being repeated from time to time as the width of the pile decreases, until the pile has attained such reduced dimensions that the further operation of the apparatus is unnecessary.

When the intermediate units of the supporting structure are removed corresponding lengths of the sprocket chains are also removed to shorten the sprocket chains to correspond with the reduced length of the supporting structures.

For convenience the tracks for the main carriages and the carriage of the apex unit may be made in sections of sufficient length to permit of their ready change of position.

Having thus fully described our invention, what we claim as new and desire to secure by Letters Patent is:

1. An apparatus for reclaiming blocks from a storage pile comprising a traveling bottom unit, a traveling top unit connected with the bottom unit and movable therewith, means for supporting the top unit as it travels with the bottom unit, and traveling means carried by the top and bottom units to drag the blocks down the storage pile.

2. In an apparatus for reclaiming the blocks from a storage pile, the combination of a main carriage, and reclaiming means combined with the carriage, said reclaiming means including a supporting structure, comprising a bottom unit movable with the main carriage, a top unit connected with the bottom unit, a carriage for the top unit movable on the top of the storage pile, and traveling means carried by the supporting structure to drag the blocks down the side of the storage pile.

3. In an apparatus for reclaiming blocks from a storage pile, the combination of a main carriage, and reclaiming means combined with the carriage, said reclaiming means including a supporting structure, comprising a bottom unit mounted on the main carriage, a top unit, removable intermediate units connecting the bottom and top units, a carriage for the apex unit movable on the top of the storage pile, and traveling means to drag the blocks down the side of the storage pile, carried by the supporting structure.

4. In an apparatus for reclaiming blocks from a storage pile, the combination of a main carriage, and reclaiming means combined with the carriage, said reclaiming means including a supporting structure, comprising a bottom unit movable with the main carriage, a top unit connected with the bottom unit, a carriage for the top unit movable on the top of the storage pile, a take-up carriage movable on the top unit, sprocket wheels journaled in bearings on the take-up carriage and on the bottom unit, sprocket chains passing around the sprocket wheels, drag elements for the sprocket chains, and means for causing the travel of the sprocket chains.

5. In an apparatus for reclaiming blocks from a storage pile, the combination of a traveling main carriage and reclaiming means comprising a supporting structure composed of a bottom unit mounted on and movable with the main carriage, a traveling top unit connected with the bottom unit and movable therewith, means for supporting the top unit as it travels with the bottom unit, and traveling means carried by the top and bottom units to drag the blocks down the storage pile.

6. In an apparatus for reclaiming blocks from a storage pile, the combination of a main carriage, and reclaiming means comprising a supporting structure including a bottom unit mounted on the main carriage, a top unit, removable intermediate units connecting the bottom and top units, a carriage for the top unit movable on the top of the storage pile, means carried by the supporting structure to drag the blocks down the side of the storage pile, and means to support the intermediate units from the pile.

7. In an apparatus for reclaiming blocks from a storage pile, the combination of a main carriage, and reclaiming means comprising a supporting structure including a bottom unit mounted on the main carriage, a top unit, removable intermediate units connecting the bottom and top units, a carriage for the top unit movable on the top of the storage pile, means carried by the supporting structure to drag the blocks down the side of the storage pile, and supports for the intermediate units, each of said supports having a base to rest upon the logs in the storage pile and a standard for the base pivotally connected with its respective intermediate unit.

8. In an apparatus for reclaiming blocks from a storage pile, the combination of a traveling main carriage and reclaiming means comprising a supporting structure, composed of a bottom unit mounted on and movable with the main carriage, a traveling top unit connected with the bottom unit and movable therewith, traveling means carried by the top and bottom units to drag the blocks down the storage pile, and means interjacent the top and bottom units to support the reclaiming means from the pile.

Toronto, June 13th, 1919.

WILBERT CARRON SOUBLIERE.
ROBERT WILLIAM McKENZIE.

Signed in the presence of—
W. J. GILCHRIST,
CHAS. H. RICHES.